Sept. 11, 1962
G. CIVITELLI
3,052,950
RASP OR FILE
Filed May 3, 1960
3 Sheets-Sheet 1
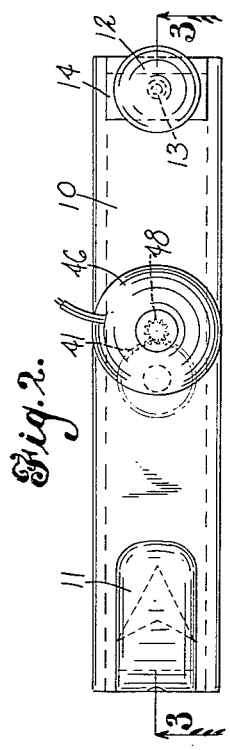
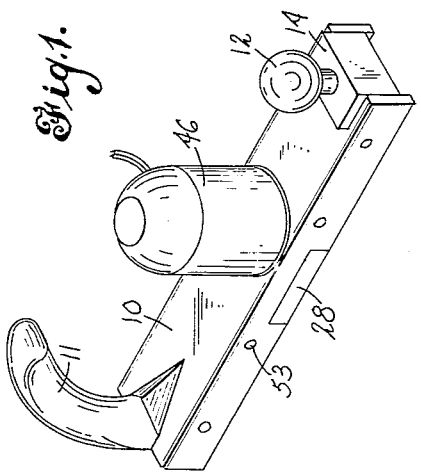
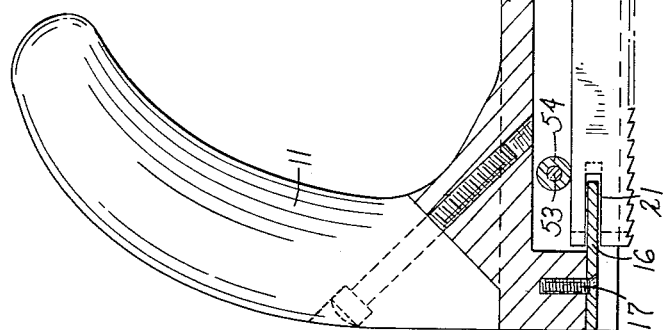
INVENTOR
GENNARO CIVITELLI
BY
ATTORNEYS

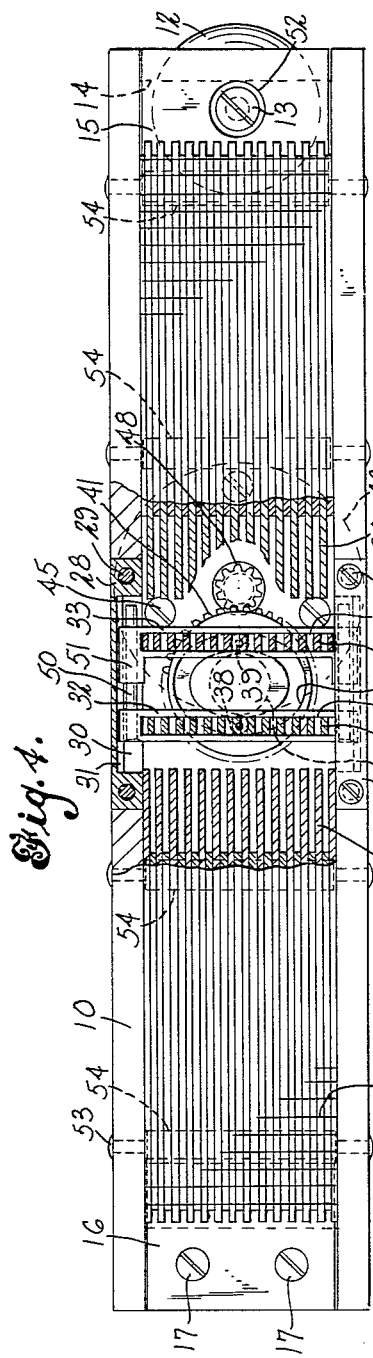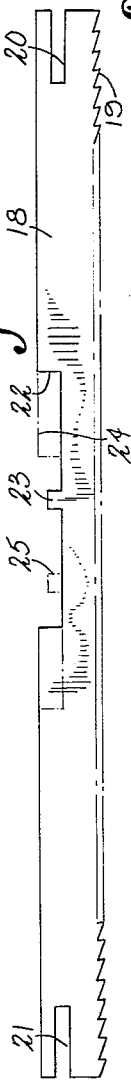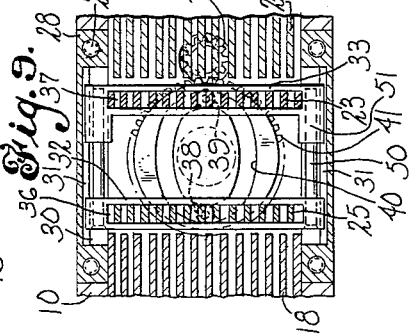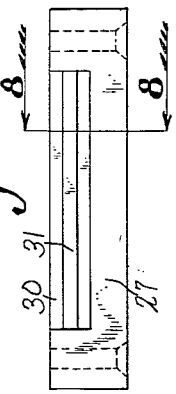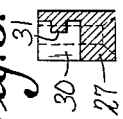

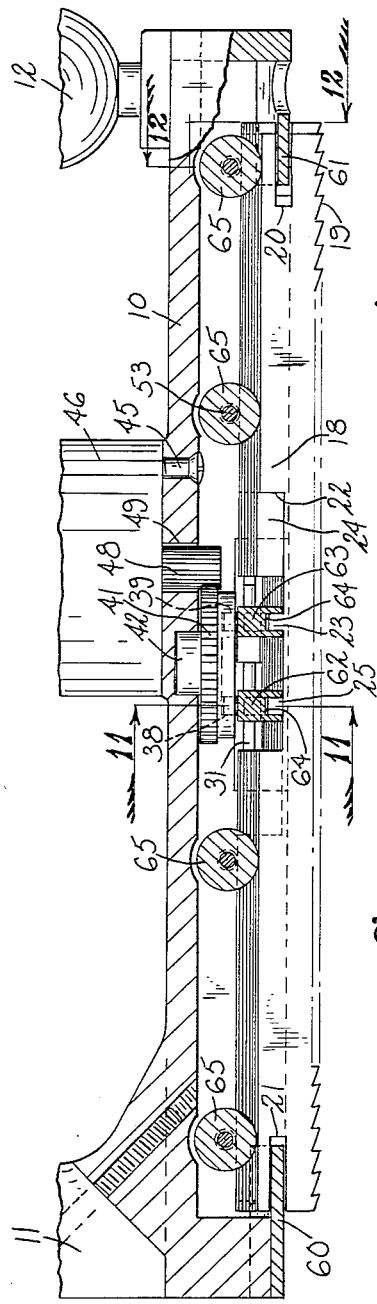
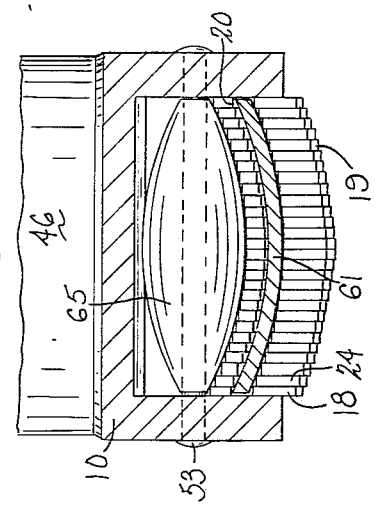
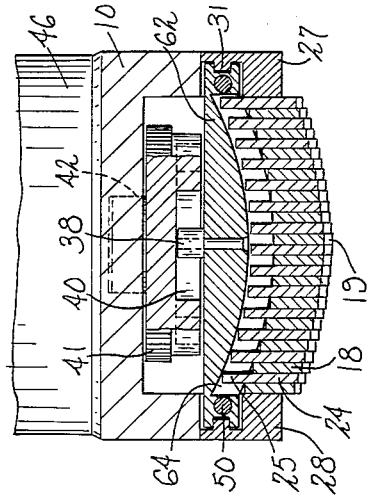

United States Patent Office 3,052,950
Patented Sept. 11, 1962

3,052,950
RASP OR FILE
Gennaro Civitelli, Hamden, Conn., assignor of fifty
percent to Harry L. Gordon, Derby, Conn.
Filed May 3, 1960, Ser. No. 26,541
9 Claims. (Cl. 29—76)

This invention relates to an abrading tool such as a rasp or file, and more particularly to a device of this character which is provided with a plurality of blades, each having a toothed or serrated edge adapted to be reciprocated so as to effect an abrading action.

As illustrated, the device comprises a frame or housing in which are supported for reciprocating movement two series of flat elongated blades, each of the blades having a saw-toothed edge such, for example, as a hacksaw blade. The blades of one series are alternately disposed with those of the other series, and supported upon the housing or frame is a motor connected to the blades to effect a reciprocating action thereof. As illustrated, the arrangement is such that the blades of one series are reciprocated in a direction opposite to those of the other series so that adjacent blades will be reciprocated simultaneously in opposite directions.

As the blades themselves will be moved by action of the motor, it is only necessary for the operator to press the working edges of the blade against the work, and it is not necessary for the tool itself to be reciprocated as is usual in abrading or filing operations. Novel means are provided to effect reciprocation of the blades, and this means and the blades themselves are so constructed that they may be economically manufactured and conveniently used while at the same time being of relatively light weight.

One object of the present invention is to provide a new and improved abrading tool such as a rasp or file which employs elongated flat blades such as hacksaw blades operated by a motor.

A further object of the invention is to provide a new and improved abrading tool employing a plurality of flat relatively thin blades having serrations or cutting teeth at one edge, these blades being held flatly together but permitted to reciprocate longitudinally and to provide means for reciprocating the blades to effect an abrading action.

Still another object of the invention is to provide an abrading tool of the character described wherein the blades are arranged in two sets or series, the blades of one series alternating with those of the other series and reciprocated in a direction opposite to those of the other series.

Still another object of the invention is to provide improved means for effecting the reciprocation of the blades in a tool of the character described by the rotation of a motor.

To these and other ends the invention consists in the novel features and combinations of parts to be hereinafter described and claimed.

In the accompanying drawings:

FIG. 1 is a perspective view of an abrading tool embodying my invention;

FIG. 2 is a top plan view thereof;

FIG. 3 is a longitudinal central sectional view on line 3—3 of FIG. 2;

FIG. 4 is an enlarged bottom plan view of the tool with some parts being broken away;

FIG. 5 is an elevational view of one of the blades;

FIG. 6 is a sectional view on line 6—6 of FIG. 3;

FIG. 7 is an elevational view of the guide plate for guiding the reciprocating members;

FIG. 8 is a sectional view on line 8—8 of FIG. 7;

FIG. 9 is a partial sectional view showing the blades and associated parts in a position differing from that shown in FIG. 4;

FIG. 10 is a view similar to FIG. 3 showing a modified form of my invention; and FIGS. 11 and 12 are transverse sectional views on lines 11—11 and 12—12 respectively of FIG. 10.

To illustrate one embodiment of the invention I have shown in the drawings an abrading tool comprising a frame 10 substantially U-shaped in cross section. Secured to the upper surface of the frame are operating handles 11 and 12, the latter being secured to the frame by the screw 13. Also secured to the frame by this screw is an L-shaped bracket 14 to which is secured a plate member 15 projecting inwardly from the end of the frame. A similar inwardly projecting plate member 16 is also secured to the frame at the other end thereof by a screw 17.

Mounted in this frame and held flatly together in side-by-side relation are a plurality of saw blades, one of which is shown in full lines at 18 in FIG. 5. This blade has a toothed or serrated cutting edge 19, and at its end edges is provided with open-ended slots 20 and 21, which slots, when the blades are mounted in the frame, may receive the plates 15 and 16 to hold the blades in place and at the same time permit them to reciprocate.

The blades 18 are each provided with a recess 22 in the upper surface thereof and in this recess is an upwardly projecting lug 23. It will be understood that a plurality of these blades are provided and, as previously stated, are arranged in two sets or series, the blade 18 exemplifying the blades of one series. The blades of the other series, which are alternated with those of the first series, are similarly formed, as shown in dotted lines at 24 in FIG. 5. These blades will also be provided with a recess which has substantially centrally thereof a lug 25 corresponding to the lug 23 in the blades 18. It will be noted, however, that while the lugs 23 of one set of blades are all aligned when mounted in the frame as are also those of the other set 24, the lugs of one set will be offset or displaced relatively to those of the other set so as to be spaced apart.

Set into openings at each side of the frame member 10 are guide members 27 and 28, these members being held in place by screws 29. As shown at 30 in FIGS. 7 and 8, each of these members is provided with a recess at its inner face into which projects a longitudinally extending guide rib 31. A pair of sliders or cross heads 32 and 33 of substantially U-shaped form in cross section are slidably mounted upon the guide members 27 and 28, each of these cross heads being provided with grooves or recesses 34 and 35 at their side edges in which the ribs 31 are received so that the cross heads will be accurately guided for sliding movement in the frame.

As shown more particularly in FIGS. 3 and 6, the lugs 23 and 25 upon the blades extend upwardly into the downwardly facing recesses 36 and 37 of the U-shaped cross heads. Secured on the upper surface of the cross heads are follower pins 38 and 39 which extend upwardly from these U-shaped members and are received in a cam groove 40 provided on the lower surface of a gear 41, the latter being rotatably mounted as shown at 42 in the frame 10.

Secured to the frame 10 by screws 45 is an electric motor 46. The shaft 47 of this motor is provided with a pinion 48 which extends through an opening 49 in the casing and engages the gear 41 to rotate the gear and the cam associated therewith. In order that the sliders 32 and 33 be properly guided relatively to each other, pins 50 are secured to the slider 32 and are snugly and slidably received in sleeves 51 secured to the slider 33 which will maintain these members in parallel relation.

As shown in FIG. 3, the plate 15 is secured to the end member 14 when the plate is provided with an opening 52 through which access may be had to the screw 13 which not only secures the handle member 12 in place but also the end member 14, the member 12 acting as a nut, and is threaded onto the screw. Removal of the screw will permit removal of the end member and the plate 15 to allow removal and insertion of the blades.

At spaced points along the frame pins 53 are secured in the side walls thereof and extend transversely across the frame, and upon these pins are rotatably mounted rollers 54 which engage the upper edges of the blades and serve as backing members to hold the blades against the work and at the same time offer as little friction as possible so as to provide for a smooth action of the blades in their reciprocating motion.

Upon operation of the motor the gear 41 will be rotated and, as the followers 38 and 39 follow the cam groove 40 which is of elliptical shape, the sliders or cross heads 32 and 33 will be moved toward and away from each other, as shown, for example, in FIGS. 4 and 9. These sliders are in position of closest approach in FIG. 4 when the lugs 23 and 25 will be brought close together, the blades 18 of one series, being engaged with the slider 33, will have been moved to their left-hand positions and the blades 24, engaged with the sliders 32, will have been moved to their right-hand positions. When the cam is moved to the position shown in FIG. 9, the sliders will have been separated and the blades 18, which are engaged by the sliders 33, will have been moved to the right while the blades 24 engaged by the sliders 32 will have been moved toward the left. Thus adjacent blades are simultaneously reciprocated in opposite directions.

As illustrated, the lugs 23 and 25 are positioned at the center of the recesses in the blades, and in this manner the same die may be used for stamping the blades regardless of the series in which they are to be placed and also regardless of whether the teeth 19 are all to face in the same direction or whether the teeth on alternate blades are oppositely faced as may be desirable in some instances.

In FIGS. 10 to 12 I have shown a somewhat modified form of my invention in which the contour of the surface formed by the serrating or cutting edges of the blades is rounded or convex instead of plane as above described. In this instance the structure is substantially like that described above with certain exceptions as will be hereinafter pointed out.

The blades will be identical with those shown in FIG. 5 but the guide plates indicated at 60 and 61 in FIG. 10 will be curved or rounded transversely of the frame 10 so as to hold the blades in such position that their exposed edges will form a convex or rounded surface as shown in FIG. 12. Likewise, as shown in FIG. 11, the sliders 62 and 63 will also be formed with convex lower faces having channels 64 therein to receive the lugs 23 and 25 of the blades.

As before pins 53 are provided at spaced points along the frame above the blades but the rollers 65 rotatably mounted upon these pins will be convex in form instead of cylindrical, as shown in FIG. 12. These rollers will engage the upper surfaces of the blades and serve as back-up rollers to hold them against the work as before. Otherwise the construction shown in FIGS. 10 to 12 is the same as that shown in FIGS. 1 to 9 inclusive and the operation is the same as that previously described.

While I have shown and described some embodiments of my invention, it will be understood that it is not to be limited to all of the details shown, but is capable of modification and variation within the spirit of the invention and within the scope of the claims.

What I claim is:

1. An abrading tool comprising a plurality of elongated flat blades, each having a toothed outer edge, frame means for holding said blades flatly together against a transverse separating movement, said blades being arranged in two series with the blades of one series alternating with those of the other series, each of said blades having a recess in its inner edge and a projecting lug in said recess intermediate the ends thereof, the lugs on the blades of each series being in alignment and spaced from those of the other series, a pair of slide members slidably mounted in the frame means and extending transversely thereacross through said recesses, each of said slide members being engaged with the lugs of one series of blades, means for simultaneously reciprocating said slide members, and said engagement comprising a channel on each of said slide members facing the inner edges of the blades in which the blade lugs are received.

2. An abrading tool comprising a horizontally elongated frame, a plurality of elongated flat blades, each having a toothed outer edge and held flatly together against transverse separating movement for longitudinal sliding movement in the frame, said blades being arranged in two series with the blades of one series being oppositely arranged with respect to the blades of the other series, and means to reciprocate the blades of each series in a direction opposite that of the other series comprising a vertically arranged motor mounted on the frame, said means including a cam member driven on a vertical axis from said motor and having a single endless cam track facing the inner edges of the blades, and the last-named means comprising a pair of slide members, one for each series of blades, slidably mounted on the frame and each having a follower received in said cam track, the blades of each series being engaged with one of said slides.

3. An abrading tool comprising a horizontally elongated frame, a plurality of elongated flat blades, each having a toothed outer edge and held flatly together against transverse separating movement for longitudinal sliding movement in the frame, said blades being arranged in two series with the blades of one series alternating with those of the other series, and means to reciprocate the blades of each series in a direction opposite that of the other series comprising a vertically arranged motor mounted on the frame, said means including a cam member driven on a vertical axis from said motor and having a single endless cam track facing the inner edges of the blades, and the last-named means comprising a pair of slide members, one for each series of blades, slidably mounted in the frame and each having a follower received in said cam track, the blades of each series being engaged with one of said slides.

4. An abrading tool comprising a horizontally elongated frame, a plurality of elongated flat blades each having a toothed outer edge and held flatly together against transverse separating movement for longitudinal sliding movement in the frame, said blades being arranged in two series with the blades of one series alternating with those of the other series, each blade having a projecting lug on its inner edge, the lugs upon the blades of each series being in alignment and spaced from those of the other series, a pair of slide members slidably received in the frame, each of which is engaged with the lugs of one series of the blades, and means for simultaneously reciprocating said slide members comprising a power-driven cam member revoluble on a vertical axis and having a single endless cam track cooperating with both of said slide members.

5. An abrading tool comprising a plurality of elongated flat blades, each having a toothed outer edge, frame means for holding said blades flatly together against a transverse separating movement, said blades being arranged in two series with the blades of one series alternating with those of the other series, each blade having a projecting lug on its inner edge, the lugs upon the blades of each series being in alignment and spaced from those of the other series, a pair of slide members slidably received in the frame means, each of which is engaged with the lugs on one series of the blades, and means for simultaneously reciprocating said slide members comprising a power-driven cam member revoluble on a vertical axis and having a single endless cam track cooperating with both of said slide members.

6. An abrading tool comprising a horizontally elongated frame, a plurality of elongated flat blades, each having a toothed outer edge and held flatly together against transverse separating movement for longitudinally sliding movement in the frame, said blades being arranged in two series with the blades of one series alternating with those of the other series, each of said blades having a recess in its inner edge and a projecting lug in said recess intermediate the ends thereof, the lugs of each blades series being in alignment and spaced from those of the other series, a pair of slide members slidably mounted in the frame for longitudinal movement therein and extending transversely thereacross through said recesses, each of said slide members being engaged with the lugs of one blade series, and means for simultaneously reciprocating said slide members comprising a power-driven cam member revoluble on a vertical axis and having a single endless cam track cooperating with both of said slide members.

7. An abrading tool as defined in claim 6 wherein each each of said slide members comprises an inverted channel-shaped part closely receiving the lugs of the corresponding series of blades for engagement therewith.

8. An abrading tool as defined in claim 7 wherein each slide member has a laterally outwardly facing recess at each end receiving a guide rib formed on the frame.

9. An abrading tool as defined in claim 8 wherein one of said slide members is provided with a pin received and slidable in a guide sleeve provided on the other slide member.

References Cited in the file of this patent
UNITED STATES PATENTS
2,493,226     Cole _____ Jan. 3, 1959